US009813420B2

(12) United States Patent
Basso et al.

(10) Patent No.: US 9,813,420 B2
(45) Date of Patent: *Nov. 7, 2017

(54) PRIORITY RESOLUTION FOR ACCESS CONTROL LIST POLICIES IN A NETWORKING DEVICE

(71) Applicant: International Business Machines Corporation, Armonk, NY (US)

(72) Inventors: Claude Basso, Nice (FR); Natarajan Vaidhyanathan, Carrboro, NC (US); Colin B. Verrilli, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 941 days.

This patent is subject to a terminal disclaimer.

(21) Appl. No.: 13/769,429

(22) Filed: Feb. 18, 2013

(65) Prior Publication Data

US 2014/0082195 A1    Mar. 20, 2014

Related U.S. Application Data

(63) Continuation of application No. 13/616,256, filed on Sep. 14, 2012.

(51) Int. Cl.
  *G06F 15/173* (2006.01)
  *H04L 29/06* (2006.01)
  *H04L 12/00* (2006.01)

(52) U.S. Cl.
  CPC .......... *H04L 63/101* (2013.01); *H04L 12/00* (2013.01); *H04L 29/06823* (2013.01)

(58) Field of Classification Search
  CPC .................................... H04L 63/101

USPC ........................................... 709/225
  See application file for complete search history.

(56) References Cited

U.S. PATENT DOCUMENTS

| 6,754,662 | B1 | 6/2004 | Li |
| 7,133,914 | B1 | 11/2006 | Holbrook |
| 7,535,906 | B2 | 5/2009 | Engbersen et al. |
| 7,602,787 | B2 | 10/2009 | Cheriton |
| 7,738,454 | B1 | 6/2010 | Panwar et al. |
| 7,778,471 | B2 | 8/2010 | Kim et al. |
| 7,889,741 | B1 | 2/2011 | Panwar et al. |
| 7,904,642 | B1 | 3/2011 | Gupta et al. |

(Continued)

OTHER PUBLICATIONS

U.S. Appl. No. 13/616,256, entitled Priority Resolution for Access Control List Policies in a Networking Device, filed Sep. 14, 2012.

*Primary Examiner* — Aftab N. Khan
(74) *Attorney, Agent, or Firm* — Patterson + Sheridan, LLP

(57) ABSTRACT

Access control lists (ACLs) permit network administrators to manage network traffic flowing through a networking element to optimize network security, performance, quality of service (QoS), and the like. If a networking element has multiple ACLs directed towards different types of network optimization, each ACL may return a separate action set that identifies one or more actions the networking element should perform based on a received frame. In some cases, these action sets may conflict. To resolve the conflicts, a networking element may include resolution logic that selects one of the conflicting actions based on a predefined precedence value assigned to each action in an action set. By comparing the different precedence values, the resolution logic generates a new action set based on the actions with the highest precedence value.

9 Claims, 4 Drawing Sheets

(56) References Cited

U.S. PATENT DOCUMENTS

| | | |
|---|---|---|
| 7,904,643 B1 | 3/2011 | Venkatachary |
| 7,908,431 B2 | 3/2011 | Krishnan |
| 7,961,734 B2 | 6/2011 | Panwar et al. |
| 7,978,079 B2 | 7/2011 | Geissler et al. |
| 8,006,088 B2 | 8/2011 | Peretti |
| 2003/0187992 A1 | 10/2003 | Steenfeldt et al. |
| 2004/0170171 A1 | 9/2004 | Kanekar et al. |
| 2013/0268729 A1 | 10/2013 | Manhas et al. |

PRIORITY RESOLUTION FOR ACCESS CONTROL LIST POLICIES IN A NETWORKING DEVICE

CROSS-REFERENCE TO RELATED APPLICATIONS

This application is a continuation of co-pending U.S. patent application Ser. No. 13/616,256, filed Sep. 14, 2012. The aforementioned related patent application is herein incorporated by reference in its entirety.

BACKGROUND

Computer systems often include multiple computers and/or servers configured to communicate over a network. In Ethernet networks, for example, packets of data are sent from computer to computer according to one or more communication protocols, such as Transmission Control Protocol (TCP) and Internet Protocol (IP). Each computer in the network may include a host Ethernet adapter configured to facilitate communications that terminate at an operating system (OS) running on the respective computer. The operating system running on each computer may include a device driver configured to interact with the host Ethernet adapter of the respective computer.

SUMMARY

Embodiments herein disclose a method of generating an action set based on a first access control list (ACL) and a second ACL stored in a networking element. The method includes comparing a portion of received network traffic to a first condition in the first ACL and to a second condition in the second ACL where the first and second conditions are associated with respective first and second actions. Upon determining that the portion satisfies both the first and second conditions, the method includes selecting one of the first and second actions as the resolved action by comparing respective precedence values assigned to the first and second actions. The method includes performing the resolved action using the networking element.

Another embodiment disclosed herein describes a networking element that includes a memory unit storing a first ACL and a second ACL, where the networking element is configured to compare a portion of received network traffic to a first condition in the first ACL and to a second condition in the second ACL. Furthermore, the first and second conditions are associated with respective first and second actions. The networking element includes a resolution module configure to select one of the first and second actions as the resolved action by comparing respective precedence values assigned to the first and second actions. The networking element includes a processor configured to performing the resolved action.

Another embodiment disclosed herein describes a computer program product to generate an action set based on a first ACL and a second ACL stored in a networking element. The computer program product includes a computer-readable storage medium having computer-readable program code embodied therewith, the computer-readable program code comprising computer-readable program code configured to compare a portion of received network traffic to a first condition in the first ACL and to a second condition in the second ACL, where the first and second conditions are associated with respective first and second actions. Upon determining that the portion satisfies both the first and second conditions, the computer-readable program code configured to select one of the first and second actions as the resolved action by comparing respective precedence values assigned to the first and second actions. The computer-readable program code configured to instruct the networking element to perform the resolved action.

Another embodiment disclosed herein describes a method to resolve a conflict between actions specified in ACLs, when processing a network packet. The method includes providing the ACLs, wherein each ACL specifies to, upon a respective condition being satisfied, perform a corresponding action to process the network packet, wherein each access control list is characterized by a respective list rank, wherein each action is characterized by a respective action rank. The method includes receiving the network packet for processing and identifying, based on the received network packet, the conflict between the corresponding actions specified in the ACLs. Upon determining that the respective action ranks are distinct, the method includes selecting to perform the corresponding action having a higher action rank. Upon determining that the respective action ranks are identical, the method includes selecting to perform the corresponding action of the ACL having a higher list rank. The method includes processing the network packet by performing the selected corresponding action on the network packet by operation of one or more computer processors, wherein the corresponding action that is not selected is not performed on the network packet, thereby resolving the conflict between the corresponding actions specified in the ACLs, in that only one of the corresponding actions is performed on the network packet.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
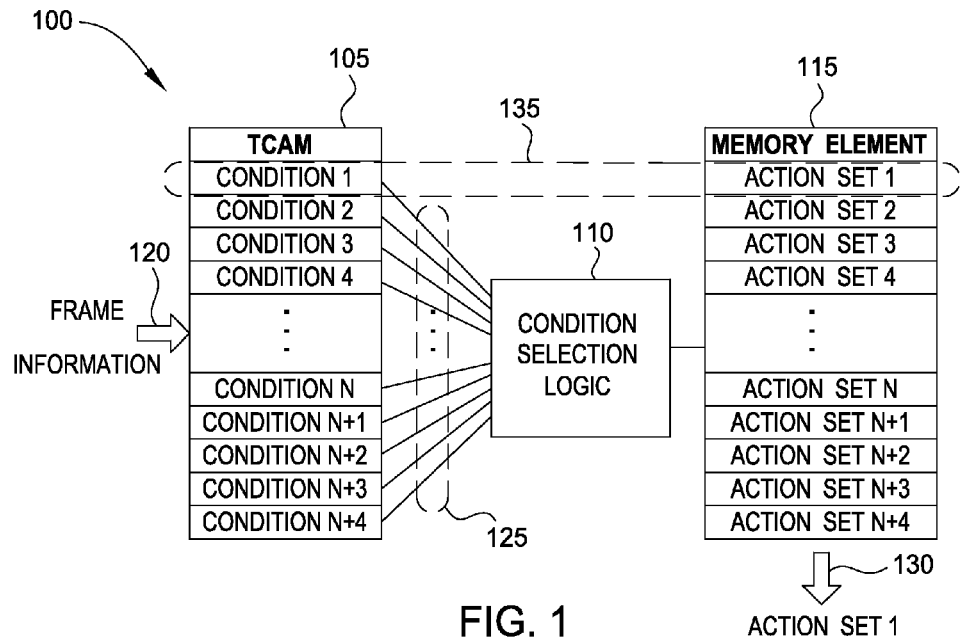
FIG. 1 illustrates hardware elements of a memory system for managing multiple ACLs in a networking element, according to one embodiment described herein.

Network devices may be configured to manage or control inbound and outbound traffic flow based on one or more predefined conditions. The predefined conditions may be represented in the form of an access control list (ACL) specifying actions to be performed by a network device when the predefined conditions are met. The ACL compares a portion of network traffic—e.g., a frame header—to one or more of the conditions. If a condition is satisfied, the ACL instructs the network device to perform a corresponding action. The actions are not limited to any particular network optimization technique. For instance, the actions may apply to network security, quality of service, prioritization, power conservation, and the like.

As such, ACLs permit network administrators to manage network traffic flowing through a networking element to optimize network security, performance, quality of service (QoS), and the like. For example, the networking element may be an integrated circuit (IC) located within a larger network device—e.g., a router, switch, bridge, etc. Furthermore, the ACLs may be used in endpoints in a network such as servers of user computing devices. Moreover, a single network element may use multiple stored ACLs to manage traffic flows. This enables different ACLs to be customized for different optimization tasks (e.g., network performance versus network security). The networking element compares the incoming frames of the network traffic to the ACLs which specify one or more actions to be performed by the networking element. Stated differently, multiple ACLs may be independently maintained within a single networking element in order to achieve different network optimizations.

However, if a networking element has multiple ACLs, then each ACL may return a separate action set that identifies one or more actions the networking element should perform based on a received frame. In some cases, these action sets may conflict. For example, one ACL may instruct the networking element to drop a particular frame while a second ACL instructs the device to forward the frame to a different networking element. In one embodiment, to resolve these conflicts, a networking element includes a resolution module (hardware, software, firmware, or some combination thereof) that determines what action to perform when separate ACLs yield actions sets with conflicting actions.

In one embodiment, the resolution module evaluates each action type within the action sets to determine whether there is a conflict. If so, the module evaluates predefined evaluation criteria associated with the different action types. That is, each action in an action set may be assigned a precedence value which the resolution module uses to select between conflicting actions in the action sets. Furthermore, in cases where actions have equivalent precedence values, the resolution module may evaluate a priority value associated with the respective ACLs in the networking element. For example, if the ACL associated with network security is assigned a higher priority value than the ACL associated with QoS, when actions within the respective action sets have the same precedence value, the resolution module selects the action from the ACL associated with network security based on its higher priority. After evaluating the individual action types in the action sets, the resolution module combines the selected actions into a resolved action set. Accordingly, the resolved action set may include actions selected from a plurality of different actions sets and ACLs and based on the techniques disclosed herein.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates hardware elements of a memory system 100 for managing multiple ACLs in a networking element, according to one embodiment described herein. Each ACL includes one or more rules. As used herein, a rule includes a condition and a corresponding action that is performed if the condition is satisfied. For example, the ACL may include a condition that if the TCP source port is greater than 1023 (i.e., the condition) then the packet should be discarded (i.e., the action). Accordingly, the action is performed only if the condition is true.

In one embodiment, ACLs may have more than one rule (i.e., more than one condition and action pair), and thus, may properly be referred to as rule groups. For example, the system administrator may want to forward a copy of a received frame if the IP source address is 9.*.*.* (where * indicates a wildcard) to a different networking element than the destination networking element (Rule 1) but drop the packet if TCP source port is greater than 1023 (Rule 2). In one embodiment, to prevent conflicts within the same ACL, the rules are arranged in a hierarchy, usually based on the order the rules are listed in the ACL. Thus, the identified action may change based on the ordering of the rules in the hierarchy.

Continuing the previous example, assume Rule 1 is higher in the hierarchy than Rule 2. If the networking element receives a data frame with a header that contains an IP source address of 9.10.000.1 and a TCP source port of 1024, only the condition associated with Rule 1 (i.e., forwarding the packet) is performed even though the frame technically also satisfies the condition associated with Rule 2. This organization enables the ACL to have multiple rules yet manage any potential conflicts that may arise. In one embodiment, the ACL may be thought of as a list of rules that are parsed in a top down manner where the contents of a received frame are compared to the conditions in the rules. The first rule having a condition that is satisfied by the frame header is selected. Even if other rules in the ACL have conditions satisfied by the header, those rules as well as their corresponding actions, are neither selected nor performed. Moreover, although the embodiments herein disclose comparing the conditions to the contents of data frames, in other embodiments, any type of network traffic may be evaluated against the condition (e.g., data packets, segments, and the like).

At least in some embodiments, each rule in an ACL may have a plurality of actions that correspond to a single condition—i.e., instead of a single action corresponding to the single condition. This plurality of actions is referred to herein as an action set. When a condition of a rule is satisfied, the ACL may return a plurality of actions to be performed by the networking element—i.e., instead of returning only the single action. In one embodiment, the action set may be further divided into different action types (e.g., a forwarding action, copying to a control point, altering a portion of the frame header, and the like) where each rule in the ACL defines a specific action to perform for each action type. Accordingly, whichever condition is satisfied first, all the actions established by that the action set of the rule specifying the condition are performed by the networking element. Depending on the embodiment, two rules within the same ACL may have the same action set or may have different actions for one or more of the action types in the action set.

As shown, the memory system 100 of the networking element includes a ternary content-addressable memory (TCAM) 105, condition selection logic 110, and a memory element 115 for establishing one or more ACLs. A content-addressable memory (CAM) is associative memory (or associative storage) that receives a data word and searches its entire memory to see if that data word is stored anywhere in the memory. If the data word is found, the CAM returns data identifying one or more storage addresses where the word is found. A binary content-addressable memory uses data search words consisting entirely of 1s and 0s; however, the TCAM 105 allows a third matching state of "don't care" ("X"). Thus, if the data word to be searched is "10010" and if the TCAM 105 stores conditions "1001X" and "1X010" in respective rows, the TCAM 105 returns data identifying the address of these rows—i.e., the conditions are satisfied by the received data word.

The memory system 100 uses the TCAM 105 to store the conditions of an ACL. As shown by an arrow 120, the networking element uses information in a received data frame to search the TCAM 105, which compares, in parallel, the frame information to each condition (i.e., conditions 1–N+4) stored in the rows of the TCAM 105. In this embodiment, the TCAM 105 indicates which conditions are satisfied by the received frame using a bit vector 125. Because each bit of the bit vector 125 corresponds to a row of the TCAM 105 that contains a condition for the ACL, the number of bits in the bit vector 125 depends on the number of conditions or rules in the ACL. The bit vector 125 may use a logical "1" to indicate that the frame information satisfied the condition and a logical "0" if it did not. For example, if the frame header contains an IP source address that satisfies conditions 1 and 3 and a TCP source port that satisfies condition 9, the bit vector 125 returned by the TCAM 105 is "1010000010 . . . " where the leftmost bit corresponds to the topmost row of the TCAM 105.

In one embodiment, the conditions stored in the TCAM 105 are made using a pattern and mask. For example, the pattern may be "9.00.000.0", and the mask may be "255.000.00.0". The portion "255" (i.e., the highest possible bit value for that portion of the pattern) indicates that this portion of the pattern is to be matched precisely. Conversely, the portion of zeros (i.e., the lowest possible bit value for that portion of the pattern) indicate that these portions of the pattern are "don't care" bits. Thus, the resulting logic is "9.*.*.*". Using a pattern and mask, the TCAM 105 can be programmed to determine whether different portions of a received frame match a condition in the TCAM 105.

As discussed above, in one embodiment, the rules of an ACL are arranged in the form of a hierarchy. Although TCAM 105 enables all conditions to be compared to the frame information simultaneously (which speeds up the ACL lookup relative to parsing each condition individually) the returned bit vector 125 indicates all the conditions that are satisfied, regardless of the established hierarchy. Accordingly, the system 100 includes condition selection logic 110 that parses through the bit vector 125 to find the first bit with a value that indicates the condition was satisfied. In the example bit vector provided above, the condition selection logic 110 would parse the bit vector "1010000010" from left to right and stop at the first logical "1". The index of the vector—in this case, index[0]—is then used as the memory address to identify the action set corresponding to the satisfied condition. Stated differently, the index of the bit vector indicates the highest-priority rule with a condition satisfied by the received frame. In one embodiment, the condition selection logic 110 may be hardware (i.e., logic circuitry), firmware, software, or some combination thereof within the networking element.

In one embodiment, the index identified by the condition selection logic 110 is then used by the networking element to identify a particular row in the memory element 115 that stores the actions sets of the ACL. As represented by arrow 130, the networking element then performs the various actions defined in the action set returned by searching the memory element 115. In this manner, the condition stored in the TCAM 105 and the action set stored in the memory element 115 are combined to yield a plurality of rules 135 for each ACL. Moreover, the TCAM 105 and memory element 115 may be logically divided to store multiple ACLs for the networking element in the same memory structures. For example, ten entries of the TCAM 105 and memory element 115 may be used to store a first ACL while another ten entries are assigned to a second ACL.

Because a particular memory address (i.e., the index of the bit vector 125 with the highest priority condition) is already identified, instead of being a special type of storage element like a CAM, the memory element 115 may be implemented by any memory type such as SRAM, DRAM, Flash memory, or other volatile or non-volatile memory elements. As shown, the TCAM 105 stores the conditions while the memory element 115 stores the actions sets. However, this embodiment is for illustration purposes only; for example, the memory element 115 may be further divided into different physical memory elements that each stores only a portion of the action set. Moreover, the TCAM 105 and condition selection logic 110 may be replaced by random access memory or other logic in embodiments where the parallel comparisons performed by the TCAM 105 is not needed (e.g., where time is not a critical factor).

Figure 2:
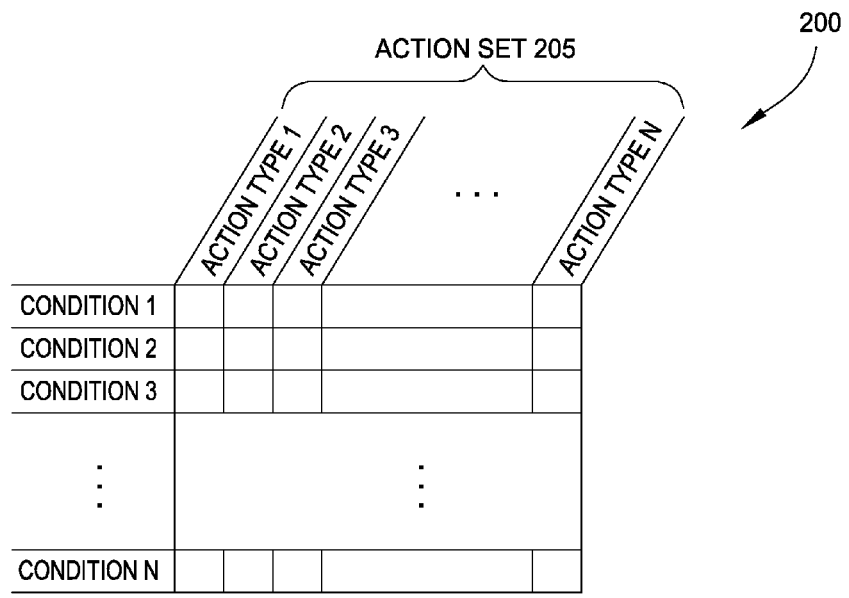
FIG. 2 is a chart that matches a satisfied condition with an action set, according to one embodiment described herein.

FIG. 2 is a chart 200 that matches a satisfied condition with an action set, according to one embodiment described herein. The chart 200 is organized to include a plurality of conditions along the X-axis and a plurality of action types along the Y-axis. The action types 1-N make up an action set 205 where each condition corresponds to exactly one action set 205. Specifically, chart 200 may represent the organization of data in the memory element 115 shown in FIG. 1 where the conditions in the X-axis may be represented by the vector index transmitted by the condition selection logic 110. That is, index[0] represent Condition 1, index[1] represents Condition 2, and so forth. Thus, based on the vector index, the chart 200 identifies the different actions associated with the action types. For example, assume action type 1 identifies the forwarding action the networking element should perform with the received data frame. For Condition 1, the action for action type 1 may be to drop the frame (or its corresponding packet), Condition 2 may instruct the networking element to forward the frame according to the destination in the frame's header, and Condition 3 may instruct the networking element to forward the frame to a specified destination regardless of its intended destination. In one embodiment, the ACL rules (i.e., the conditions and action sets 205) are provided by a user, such as an administrator. That is, the networking element may include functionality that permits the administrator to configure the ACL by adding or subtracting rules or changing existing ones.

Figure 3:
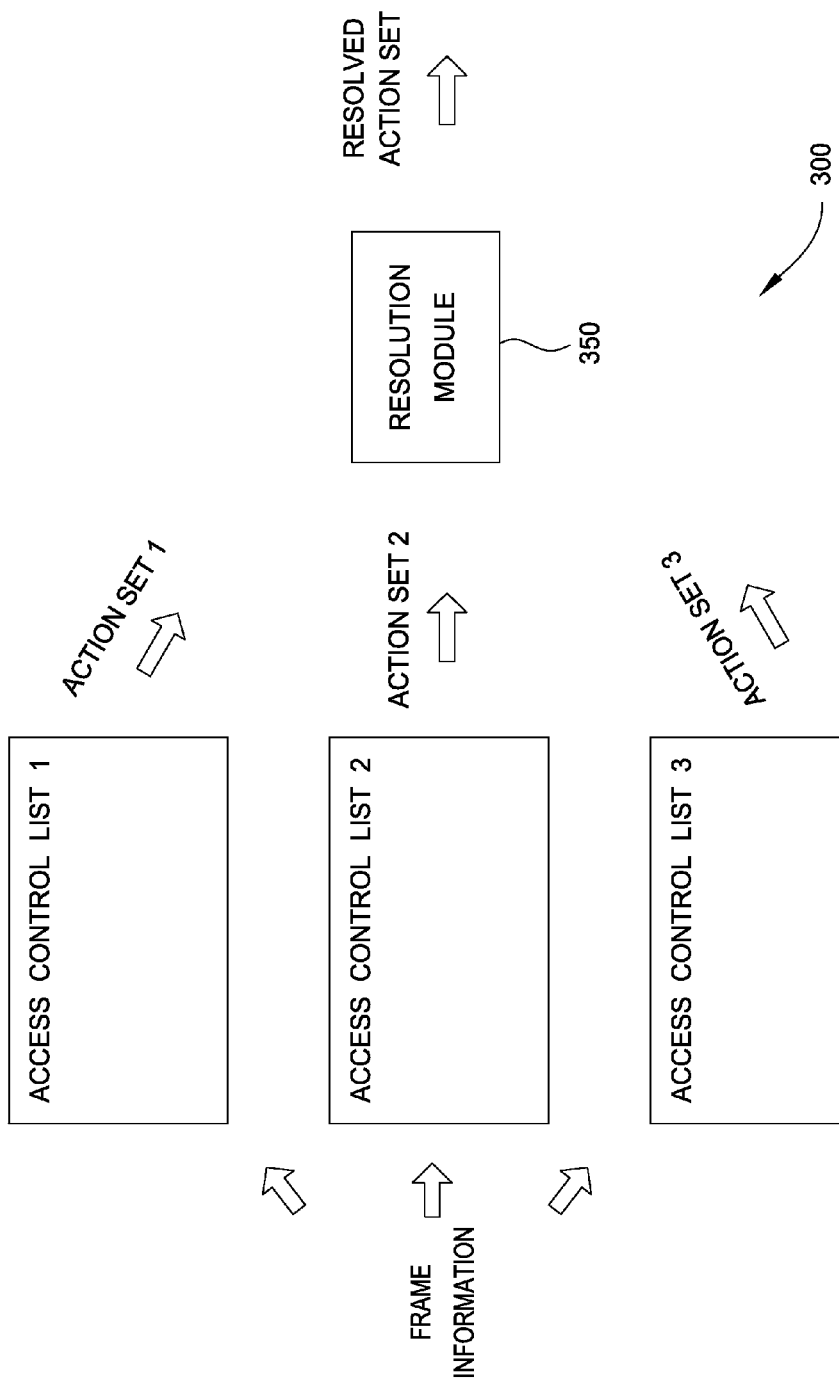
FIG. 3 is a flow chart for resolving multiple action sets into a single action set, according to one embodiment described herein.

FIG. 3 is a flow chart 300 for resolving multiple action sets into a single action set, according to one embodiment described herein. The chart 300 includes ACLs (Access Control Lists 1, 2, and 3) that each return an independent action set based on receiving the same information. Here, ACLs 1, 2, and 3 are sent the same frame but may yield different action sets depending on the different predefined rules within each ACL. In one embodiment, ACLs 1, 2, and 3 are three different instantiations of the memory system 100 shown in FIG. 1. Alternatively, the ACLs may share the same hardware elements shown in system 100—e.g., the TCAM 105 and memory element 115 are logically divided to assign entries to the three ACLs.

Advantageously, having multiple independent ACLs enable the ACLs to include rules that focus on different areas of network optimization. Therefore, each time a particular ACL is updated (e.g., a rule is changed, added, or removed) the other ACLs remain unchanged. Different system administrators may update a particular ACL independent of how the changes affect other ACLs stored in the networking element. However, three independent ACLs mean that the same frame information results in three actions sets, which may be different. Because the networking element can typically perform only one action for each action type in a set, the networking element selects between the actions returned from the three action sets.

As shown, the flow chart 300 includes a resolution module 350 which may be hardware, firmware, software, or some combination thereof located within the networking element. In one embodiment, the resolution module 350 may choose one of the three action sets to use as the resolved action set. For example, if the system administrators assign the highest priority to ACL 1 (e.g., a network security ACL), the resolution module 350 uses Action Set 1 as the resolved action set. In other embodiments, to provide additional granularity, the resolution module 350 may evaluate each action type in the action sets individually. As shown by chart 200 in FIG. 2, an action set may be divided into a plurality of action types where each rule defines a specific action for each action type. In addition to defining a specific action for each action type, the system administrator may also define a precedence value for each action. For example, a template for defining an action may be <precedence value><Operation><OpData>. The precedence value may be, for example, a single bit (e.g., 1 is high precedence and 0 is low precedence) or multiple bits that represent a numeric ranking such as 1-10. The Operation value corresponds to the operation the networking element should perform, e.g., forwarding or copying the frame, while the OpData value is the data associated with the operation—e.g., a destination for the frame. Not all operations need to have data associated with them. For example, if the operation is to discards the frame, then the there is no data associated with this operation—i.e., OpData is null or empty. If, however, the Operation is to change the priority bits in the frame, then the OpData will be the new value.

In one embodiment, using this template, the system administrator assigns a precedence value for each action in the action set, and based on the precedence value, the resolution module 350 chooses which action to include in the resolved action set. That is, for action type 1, the resolution module 350 compares the respective precedence values for the three action sets and stores the action with the highest precedence value into action type 1 for a resolved action set. The resolution module 350 performs the same comparison for the rest of the shared action types in the action sets until the resolved action set includes all the actions with the highest precedence values. Thus, in contrast to using the action set associated with the highest priority ACL, the resolved action set may include actions from multiple ACLs. The networking element may then perform the actions stored in the resolved action set.

Figure 4:
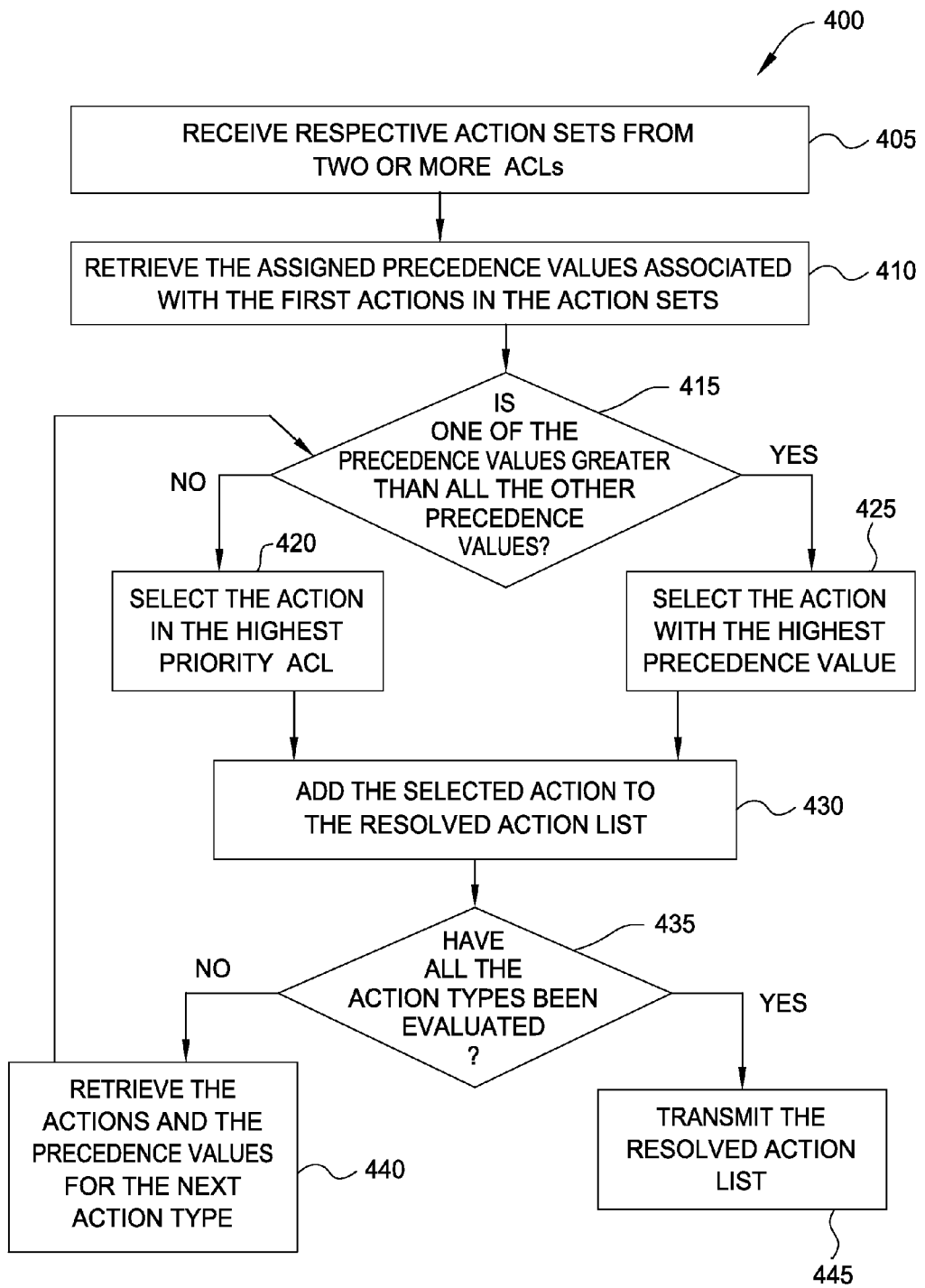
FIG. 4 illustrates a method for generating a resolved action set, according to one embodiment described herein.

FIG. 4 illustrates a method for generating a resolved action set, according to one embodiment described herein. Method 400 begins at block 405 where the resolution module receives two or more actions sets from respective ACLs. Instead of selecting all the actions from only one of the actions sets, at block 410 the resolution module retrieves the assigned precedence values associated with the first actions in the ACLs. In one embodiment, the actions sets define actions and precedence values for a plurality of shared action types. For example, in one of the received action sets, the action may be to drop a packet while an action in a different action set instructs the networking element to forward the packet to its destination. The resolution module uses the associated precedence value to select between these conflicting actions.

At block 415, the resolution module determines whether one of the precedence values for a first action is higher than each of the other respective actions in the actions set. If so, at block 425, the resolution module assigns the action with the highest precedence to action type 1 in the resolved action set. If not, at block 420, the resolution module may use a separate predefined priority for determining which action to select when one action does not have a greater priority than the rest—i.e., there is a tie for the highest precedence value. In method 400, the resolution module uses a predefined priority assigned to each ACL in the networking element as a tiebreaker. For example, each ACL may be assigned an overall precedence value (in addition to assigned precedence values for each action) relative to the other ACLs. So long as the ranking is exclusive—i.e., no ACLs has the same ranking as another ACL—the resolution module breaks the tie by choosing the action associated with the highest-priority ACL. Alternatively, instead of selecting between the actions that tie with the highest precedence value, the resolution module may simply choose the action associated with the highest-priority ACL, even if that particular action did not have the highest precedence value. Furthermore, using the priority of the ACLs is only one example of determining between actions when no action has a precedence value higher than the other actions. Other techniques may also be used, such as selecting one action at random or selecting an ACL each time a tie occurs, based on a round-robin approach.

At block 430, the selected action for action type 1 is stored in the resolved action list. At block 435, the resolution module further determines whether all the action types for the resolved action set have been evaluated. If not, the resolution module retrieves the actions and precedence values for the next action type (e.g., action type 2) at block 440 and returns to block 415 to select one of the actions to store in the resolved action set.

In one embodiment, action types may be related such that multiple actions are selected at once from an action set. For example, action type 2 may be dependent on action type 1. Accordingly, once the resolution module selects the action for action type 1, the module automatically selects the action for action type 2 from the same action set. Thus, at block 435, the resolution module stores both actions into the resolved action set and, at block 440, begins to evaluate the actions for action type 3. Once all the actions for the different action types have been selected, at block 445, the resolution module transmits the completed, resolved action set to other portions of the networking element for further processing. Alternatively, instead of waiting for the entire action set to be resolved, the resolution module may transmit actions to be performed as soon as the actions are selected.

In one embodiment, the method 400 performs steps 415-440 only if there is a conflict between the received action sets. For example, before performing step 415, the resolution module may parse through the actions sets from the plurality of ACLs to determine if the actions are conflicting. If there are no conflicts, the resolution module may choose any one of the actions sets as the resolved action set without spending the processing time to evaluate the precedence value of each action.

An Example System

Figure 5:
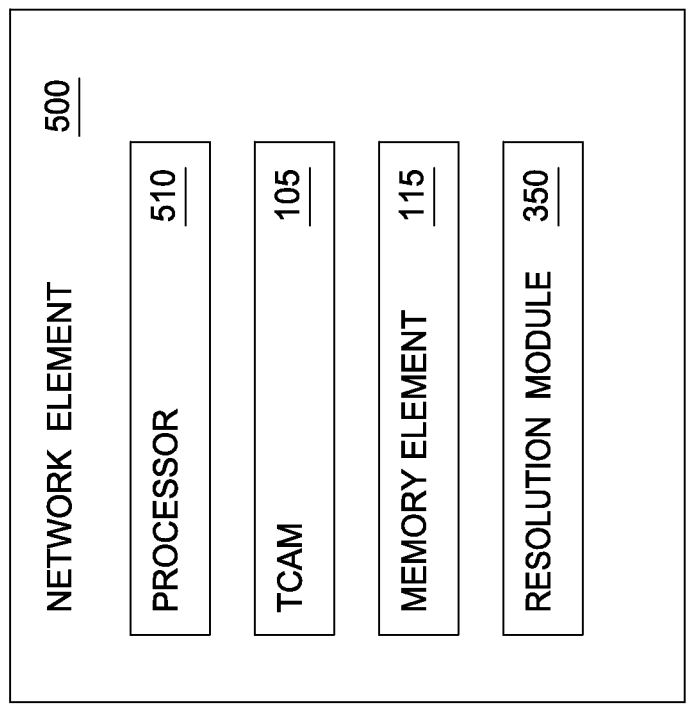
FIG. 5 illustrates is a block diagram of a networking element, according to one embodiment described herein.

FIG. 5 illustrates a block diagram of a networking element, according to one embodiment described herein. The networking element 500 includes a processor 510, TCAM 105, memory element 115, and resolution module 350. In one embodiment, the networking element 500 may be an integrated circuit (IC) such that the processor 510, TCAM 105, memory element 115, and resolution module 350 are part of a single chip. However, in other embodiments, these components of the networking element 500 may be part of different chips or independent units that are communicatively coupled to form the networking element 500. For example, the components may be mounted on a shared substrate (e.g., PCB) and communicatively coupled by wire traces.

The processor 510 may be any suitable processor or processing element for performing the functions described herein. The processor 510 may include a plurality of different processors or a single processor with multiple cores. The TCAM 105, as described above, is an associative memory element that permits a data word to be compared, in parallel, to each entry in its rows. In one embodiment, the TCAM 105 is configured using a pattern and mask technique to contain a condition for each rule in an ACL. The TCAM 105 compares a portion of the incoming network traffic (e.g., a header of a frame) to the saved conditions to determine which conditions are satisfied by the network traffic portion. Once a satisfied condition is identified, the networking element 500 may use the memory element 115 to look up the action set corresponding to the satisfied condition. That is, each condition in the TCAM 105 may correspond to a single action set stored in the memory element 115.

In one embodiment, the networking element 500 performs different functions such as packet routing or QoS. The networking element 500 may control these functions based on the actions in the action set. Moreover, the network element 500 may include a plurality of independent ACLs that may each return different action sets. To select which action set to perform, the network element 500 includes a resolution module 350 that evaluates a precedence value for each action in the action sets and stores the action with the highest priority into a resolved action set. After each action type is evaluated, the resolution module 350 passes the resolved action set to the processor 510 for further processing.

In one embodiment, the networking element 500 is used to connect different networks together (e.g., a WAN to a LAN) or connect an Ethernet network to a end device such as a server or user computing device, and thus, may be part of a larger networking device such as a Ethernet switch, router, bridge, and the like.

CONCLUSION

In one embodiment, if a networking element has multiple ACLs, then each ACL returns a separate action set that identifies one or more actions the networking element should perform based on a received frame. In some cases, these action sets may conflict. For example, one ACL may instruct the networking element to drop a particular frame while a second ACL instructs the device to forward the frame to a different networking element. To resolve these conflicts, a networking element may include a resolution module (hardware, software, firmware, or some combination thereof) that determines what action to perform when separate ACLs yield actions sets with conflicting actions.

In one embodiment, the resolution module evaluates each action type within the action sets to determine whether there is a conflict. If so, the module evaluates predefined evaluation criteria associated with the different action types. That is, each action in an action set may be assigned a precedence value used by the resolution module to select between the actions in the action sets. Furthermore, in cases where actions have equivalent precedence values, the resolution module may additionally evaluate a priority value associated with the respective ACLs in the networking element. For example, if the ACL associated with network security is assigned a higher priority value than the ACL associated with QoS, when actions within the respective action sets have the same precedence value, the resolution module selects the action from the ACL associated with network security based on its higher priority. After evaluating the individual action types in the action sets, the resolution module combines the selected actions into a resolved action set. Accordingly, the resolved action set may include actions selected from a plurality of different actions sets and ACLs.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of generating an action set based on a first access control list (ACL) and a second ACL stored in a networking element, the method comprising:
   comparing, using one or more computer processors, a portion of received network traffic to a first condition in the first ACL and to a second condition in the second ACL, wherein the first and second conditions are associated with respective first and second actions;
   upon determining that the portion satisfies both the first and second conditions and before evaluating respective precedence values assigned to the first and second actions, evaluating the first and second actions to identify a conflict;
   upon determining the first action conflicts with the second action, compare the respective precedence values assigned to the first and second actions;
   upon determining that the respective precedence values are equivalent, compare respective priority scores associated with the first ACL and the second ACL, wherein the priority score ranks the first and second ACLs;
   select a resolved action based on the respective priority scores;
   performing the resolved action using the networking element;
   comparing a different portion of the received network traffic to a third condition in the first ACL and to a fourth condition in the second ACL, wherein the third and fourth conditions are associated with respective third and fourth actions; and
   upon determining that the third action does not conflict with the fourth action, selecting one of the third and fourth actions without evaluating respective precedence values assigned to the third and fourth actions.

2. The method of claim 1, wherein the respective priority scores are predefined by a system administrator.

3. The method of claim 1, wherein the respective precedence values are predefined by a system administrator.

4. The method of claim 1, wherein the networking element comprises a processing element and at least one memory element storing the first and second ACLs.

5. The method of claim 1, wherein the resolved action is part of a resolved action set, the resolved action set comprising at least one action selected from the first ACL and the second ACL.

6. The method of claim 1, wherein the first and second ACLs each comprise a plurality of rules, each rule comprising a test condition and at least one action, wherein the action is selected only if the test condition is satisfied.

7. The method of claim 6, wherein the portion of received network traffic satisfies multiple test conditions in the first and second ACLs, further comprising:

selecting one of the multiple test conditions for each of the first and second ACLs based on a hierarchical arrangement of the plurality of rules in the first and second ACLs, wherein the first action is associated with the one test condition selected from the first ACL and the second action is associated with the one test condition selected from the second ACL.

8. A method to resolve a conflict between actions specified in access control lists (ACLs), when processing a network packet, the method comprising:

providing the ACLs, wherein each ACL specifies a plurality of conditions with corresponding actions for processing the network packet wherein each ACL is characterized by a respective list rank, wherein each action is characterized by a respective action rank;

receiving the network packet for processing using one or more computer processors;

before evaluating the respective list rank and action rank, identifying, based on the received network packet, the conflict between the corresponding actions specified in the ACLs;

upon determining that the respective action ranks are distinct, selecting to perform the corresponding action having a higher action rank;

upon determining that the respective action ranks are identical, selecting to perform the corresponding action of the ACL having a higher list rank; and processing the network packet by performing the selected corresponding action on the network packet by operation of one or more computer processors, wherein the corresponding action that is not selected is not performed on the network packet, thereby resolving the conflict between the corresponding actions specified in the ACLs, in that only one of the corresponding actions is performed on the network packet.

9. The method of claim 8, wherein the respective list rank and action rank are predefined by a system administrator.

* * * * *